3,340,294
N-SUBSTITUTED AND UNSUBSTITUTED ALKYL AND ALKENYL-2-DIMETHYLAMINO-BENZHYDRYLCARBAMATES
Sidney B. Richter and David P. Mayer, Chicago, Ill., assignors to Velsicol Chemical Corporation, Chicago, Ill., a corporation of Illinois
No Drawing. Filed May 10, 1965, Ser. No. 454,688
5 Claims. (Cl. 260—482)

This invention relates to new chemical compositions of matter. More particularly, this invention relates to new chemical compositions of the formula

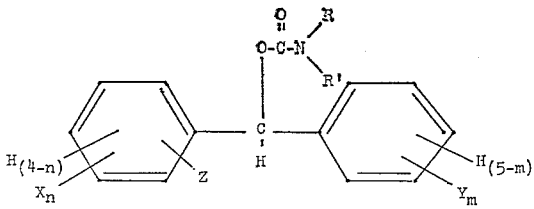

wherein R is selected from the group consisting of substituted and unsubstituted alkyl and alkenyl; R' is selected from the group consisting of hydrogen and substituted and unsubstituted alkyl and alkenyl; Z is dialkylamino in the 2-position; each X and Y is independently selected from the group consisting of dialkylamino, alkyl, alkenyl, halogen, nitro, alkoxy and alkylthio; $n$ is an integer from 0 to 2; and $m$ is an integer from 0 to 3. In a preferred embodiment of this invention R is selected from the group consisting of lower alkyl, lower alkenyl, lower alkoxyalkyl, lower mono and polychloroalkyl, R' is selected from the group consisting of hydrogen and R; Z is di (lower alkyl) amino in the 2-position; X and Y are independently selected from the group consisting of di (lower alkyl) amino, lower alkyl, lower alkenyl, halogen, nitro, lower alkoxy, and lower alkylthio; $n$ is an integer from 0 to 2; and $m$ is an integer from 0 to 3. In another preferred embodiment R and R' are as heretofore described, Z is di (lower alkyl) amino in the 2-position, X is halogen in the 5-position, $n$ is 1 and $m$ is 0.

Unexpectedly, the compounds of the present invention are effective as acaricides and fungicides. Exemplary of compounds of the present invention are:

N-methyl-2-dimethylaminobenzhydrylcarbamate,
N-allyl-2-dimethylaminobenzhydrylcarbamate,
N-methoxyethyl-2-dimethylaminobenzhydrylcarbamate,
N-methyl-N-ethyl-2-dimethylaminobenzhydrylcarbamate,
N-beta-chloroethyl-2-dimethylaminobenzhydrylcarbamate,
N-beta-chloroethyl-2-dimethylaminobenzhydrylcarbamate,
N-methyl-2-dimethylamino-5-chlorobenzhydrylcarbamate,
N-methyl-2-dimethylamino-4-chlorobenzhydrylcarbamate,
N-methyl-2-dimethylamino-5-bromobenzhydrylcarbamate,
N-methyl-2,4,4'-tris(dimethylamino)benzhdrylcarbamate,
N-n-propyl-2-di-n-propylamino-4'-bromobenzhydrylcarbamate,
N-beta-chloroethyl-2-di-ethylamino-5'-bromobenzhydrylcarbamate,
N,N-diallyl-2-dimethylamino-5'-chlorobenzhydrylcarbamate,
N,N-dimethyl-2-di-isopropylamino-5-chloro-4'-methoxybenzhydrylcarbamate,
N-isopropyl-2-di-(2-ethylhexyl)amino-3'-chloro-4'-methylbenzhydrylcarbamate,
N-beta, beta-dichloroethyl-2-di-n-propylamino-4,5-dichlorobenzhydrylcarbamate,
N-methyl-2-diethylamino-2',4-dimethoxybenzhydrylcarbamate,
N-methyl-2-dimethylamino-2'-allylbenzhydrylcarbamate,
N,N-dimethyl-2-diethylamino-2'-methylthiobenzhydrylcarbamate,
N-methyl-2-(N'-methyl-N'-ethylamino)-5-chlorobenzhydrylcarbamate,
N-methyl-2-(N'-methyl-N'-n-propylamino)-5-chlorobenzhydrylcarbamate,
N-methyl-2-(N'-methyl-N'-isopropylamino)-5-chlorobenzhydrylcarbamate,
and the like These compounds can be prepared readily, for example, by reacting a suitable dialkylaminobenzhydrol with a suitable isocyanate or carbamoyl halide. The reaction can be conveniently carried out in a suitable solvent such as benzene, dioxane, and the like. An excess of the isocyanate or carbamoyl halide is preferably utilized in this reaction. The reaction mixture is heated, for example at reflux if benzene or dioxane is utilized, for from about 6 to about 24 hours with stirring. A catalyst or base such as triethylamine can also be utilized, particularly when the carbamoyl halide is used as a reactant, and in that case a stoichiometric amount is preferred. The solvent is removed from the reaction mixture and the desired compound recovered by methods common to the art such as by boiling with charcoal and recrystallizing from a suitable solvent.

Suitable dialkylaminobenzhydrol reactants useful in the preparation of the compounds of the present invention can be readily prepared by several methods from the corresponding dialkylaminobenzophenone, for example by reduction with lithium aluminum hydride. The dialkylaminobenzophenone can be prepared from the corresponding aminobenzophenone by alkylation procedures known to the art, such as treatment with dimethyl sulfate, formic acid and formaldehyde, alkyl halides or alkenyl halides, and combinations thereof. In some cases the dialkylaminobenzophenone can be prepared from the corresponding halobenzophenone by reaction with dialkylamines, such as N-methyl-N-ethylamine, N-methyl-N-isopropylamine, N-methyl-N-n-propylamine, N-methyl-N-n-butylamine, N-methyl-N-sec-butylamine, N-methyl-N-amylamine, N-ethyl-N-n-propylamine, N-ethyl-N-isopropylamine. Exemplary of various of these starting materials are: 2-dimethylaminobenzhydrol, 2-dimethylamino-5 - chlorobenzhydrol, 2-dimethylamino-4-chlorobenzhydrol, 2-dimethylamino-5-bromobenzhydrol, 2-bromobenzophenone, 2-chlorobenzophenone, 2,2'-dibromobenzophenone, 2,4-dibromobenzophenone, 2,6-dibromobenzophenone, 2-bromo-5 - chlorobenzophenone, 2-bromo-3'-chlorobenzophenone, 2-bromo-3',5-dichlorobenzophenone, 2-bromo - 4 - methylbenzophenone, 4 - dimethylamino-2' - chlorobenzophenone, 2-amino-4,4'-bis(dimethylamino)benzophenone, 2-amino-4'-bromobenzophenone, 2-amino-5'-bromobenzophenone, 2-amino-5'-chlorobenzophenone, 4-amino-2' - chlorobenzophenone, 2-amino-5-chloro-4'-methoxybenzophenone, 2'-amino-3-chloro-4-methylbenzophenone, 4-amino-2-chloro-2'-methylbenzophenone, 2-amino - 4,5 - dichlorobenzophenone, 2-amino-2',4 - dimethoxybenzophenone, and the like.

Among the suitable isocyanates and carbamoyl halides for use in the preparation of the compounds of this invention are: lower alkyl isocyanates, such as: methylisocyanate, ethylisocyanate, n-propylisocyanate, isopropylisocyanate, cyclohexylisocyanate, isobutylisocyanate, tert-butylisocyanate, and the like; alkenyl isocyanates, such as allylisocyanate, and the like; alkoxyalkyl isocyanates, such as methoxymethyl isocyanate, 2 - methoxyethylisocyanate, ethoxymethyl isocyanate, and the like; chloroalkyl isocyanates, such as dichloromethylisocyanate, 2-chloroethylisocyanate, 1-chloro-1 - methylethylisocyanate, and the like; dialkyl carbamoyl halides, such as dimethylcarbamoyl bromide, diethylcarbamoyl chloride, dimethylcarbamoyl chloride, diisopropylcarbamoyl chloride, dibutylcarbamoyl chloride, dicyclohexylcarbamoyl chloride, dipentylcarbamoyl chloride, and the like; alkenylcarbamoyl halides, such as divinylcarbamoyl chloride, isopropenylcarbamoyl bromide, allyl-tert-butylcarbamoyl chloride, allyl-(chloromethyl) carbamoyl chloride, and the like; alkoxyalkyl carbamoyl halides, such as bis(2-ethoxyethyl) carbamoyl chloride, (2-ethoxyethyl)ethylcarbamoyl chloride, ethyl(2-methoxyethyl) carbamoyl chloride, and the like; and chloroalkyl carbamoyl halides, such as 2-chloroethyl carbamoyl fluoride, bis(chloromethyl) carbamoyl chloride, bis(dichloromethyl) carbamoyl chloride, and the like.

The manner in which the new compounds of the present invention can be prepared readily is illustrated in the following examples:

EXAMPLE 1

Preparation of N-methyl-2-dimethylamino-5-chlorobenzhydrylcarbamate 2-dimethylamino-5-chlorobenzhydrol (10 g.), methylisocyanate (10 g.), triethylamine (1 ml.) and benzene (150 ml.) were placed in a 250 ml. three-neck, round-bottom flask equipped with a mechanical stirrer, internal thermometer and reflux condenser. The mixture was stirred and heated at reflux for about 17 hours. Benzene was removed from the reaction mixture by warming the mixture under reduced pressure. The residue was triturated with pentane and allowed to solidify to a solid having a melting point of 86–90° C. The solid was recrystallized from hexane to yield the desired N-methyl-2-dimethylamino-5-chlorobenzhydrylcarbamate as a solid melting 90–92° C. and having the following elemental analysis as calculated for $C_{17}H_{19}ClN_2O_2$.

Theoretical: C, 64.04%; H, 6.01%; N, 8.79%. Found: C, 64.37%; H, 6.33%; N, 8.63%.

EXAMPLE 2

Preparation of N-allyl-2-dimethylamino-5-chlorobenzhydrylcarbamate 2-dimethylamino-5-chlorobenzhydrol (4.8 g.; 0.02 mol), allylisocyanate, 2.5 g.; 0.03 mol), triethylamine (1 g.) and benzene (50 ml.) were placed in a 250 ml. three-neck round bottomed flask equipped with a mechanical stirrer, internal thermometer and reflux condenser. The mixture was stirred and heated at reflux for about 17 hours. The mixture was cooled and then heated under reduced pressure to remove benzene. The residue solidified on cooling and was recrystallized from absolute ethanol to yield N-allyl-2-dimethylamino-5-chlorobenzhydrylcarbamate as a white, needle-like solid having a melting point of 149–151° C. and the following elemental analysis.

Calculated for $C_{19}H_{21}ClN_2O_2$. — Theoretical: C, 66.17%; H, 6.14%; N, 8.12%. Found: C, 65.73%; H, 6.37%; N, 8.10%.

EXAMPLE 3

Preparation of N-isopropyl-2-dimethylamino-5-chlorobenzhydrylcarbamate 2-dimethylamino-5-chlorobenzhydrol (5.2 g.; 0.02 mol), isopropylisocyanate (2.5 ml.), triethylamine (1 g.) and benzene (50 ml.) were placed in a 250 ml. three-neck, round bottomed flask equipped with a mechanical stirrer, internal thermometer and reflux condenser. The mixture was stirred and heated at reflux for 17 hours. The reaction mixture was cooled and benzene removed by heating under reduced pressure. The residue solidified and was recrystallized from a benzene-heptane mixture to yield N-isopropyl-2-dimethylamino-5-chloro-benzhydrylcarbamate as a white solid melting at 110–113° C. A portion of the product which was recrystallized a second time had a melting point of 110–110.5° C. and the following elemental analysis.

Calculated for $C_{19}H_{23}ClN_2O_2$.—Theoretical: C, 65.79%; H, 6.68%; N, 8.08%. Found: C, 65.45%; H, 7.02%; N, 7.84%.

EXAMPLE 4

Preparation of N,N-dimethyl-2-dimethylamino-5-chlorobenzyhydrylcarbamate 2-dimethylamino-5-chlorobenzhydrol (2.6 g., 0.01 mol), N,N-dimethylcarbamoyl chloride (2.5 g., 0.2 mol), triethylamine (2 g.) and xylene (50 ml.) were placed in a 250 ml. three-neck round bottomed flask equipped with a mechanical stirrer, internal thermometer and reflux condenser. The mixture was stirred and heated at reflux for about 17 hours. The mixture was cooled to room temperature and filtered. The filtrate was washed with water, dried over anhydrous sodium sulfate, filtered and the filtrate distilled on a steam bath at 0.1 mm. mercury for one hour. This residue was determined to be N,N-dimethyl-2-dimethylamino-5-chlorobenzhydrylcarbamate by infrared analysis and had the following element analysis as calculated for $C_{18}H_{21}ClN_2O_2$.

Theoretical: C, 64.95%; H, 6.36%; N, 8.42%. Found: C, 64.91%; H, 6.63%; N, 8.18%.

EXAMPLE 5

Preparation of N-beta-chloroethyl-2-diethylamino-5'-bromobenzhydrylcarbamate 2-amino-5'-bromobenzophenone (50.4 g., 0.2 mol), ethylbromide (55 g., 0.5 mol), triethylamine (50 g.) and ethanol (150 ml.) are placed in a 250 ml. three-neck, round bottomed flask equipped with a mechanical stirrer, internal thermometer and reflux condenser. The reaction mixture is gently heated over a period of several hours. The reaction mixture is then heated under reduced pressure to remove ethanol, and the residue treated with aqueous sodium hydroxide (88 g., 2.2 moles). The organic layer is separated, washed with water, dried, and distilled under reduced pressure to remove unreacted materials. The residue is purified by distilling and/or recrystallizing from a suitable solvent to obtain 2-diethylamino-5'-bromobenzophenone.

Lithium aluminum hydride (10 g.) in anhydrous diethyl ether (800 ml.) is stirred in a 2-liter flask equipped with a reflux condenser topped by a drying tube. 2-diethylamino-5'-bromobenzophenone (18 g.), prepared as described above, dissolved in anhydrous diethyl ether (500 ml.) is added to the flask over a period of 15 minutes. The flask is heated at reflux for 6 hours. A solution of sodium potassium tartrate (7.8 g.) dissolved in water (40 ml.) is added dropwise to the cooled, stirred reaction mixture. The resulting mixture is filtered, and the filtrate washed with water, dried over anhydrous magnesium sulfate, and filtered. The filtrate is heated on a steam bath under reduced pressure to remove diethyl ether and yield 2-diethylamino-5'-bromobenzhydrol as the residue.

2-diethylamino-5'-bromobenzhydrol (6.68 g., 0.02 mol), 2-chloroethylisocyanate (18.5 g.), triethylamine (1 g.) and benzene (50 ml.) are placed into the flask described in the previous examples and heated at reflux for 17 hours. The reaction mixture is cooled and benzene removed by heating under reduced pressure to yield N-beta-chloroethyl - 2 - diethylamino - 5' - bromobenzhydrylcarbamate as the residue.

The other compounds of the present invention can be prepared readily by the procedures described above. Presented in the following examples are the essential reactants required to prepare the indicated named compounds according to the methods detailed in the foregoing examples:

EXAMPLE 6

2 - dimethylaminobenzhydrol+methoxymethylisocyanate=N - methoxymethyl - 2 - dimethylaminobenzhydrylcarbamate.

EXAMPLE 7

2 - amino - 4,4' - bis(dimethylamino)benzophenone +formic acid and formaldehyde+bis(2-ethoxyethyl)-carbamoyl chloride=N,N-di-(2-ethoxyethyl)-2,4,4'-tris-(dimethylamino)-benzhydrylcarbamate.

EXAMPLE 8

2 - amino - 5 - chloro - benzophenone+ethylbromide +formic acid and formaldehyde+methylisocyanate =N - methyl - 2 - (N' - methyl - N' - ethylamino) - 5-chloro-benzhydrylcarbamate.

EXAMPLE 9

2 - amino - 2',4 - dimethoxybenzophenone+ethylbromide+divinylcarbamoyl chloride=N,N-divinyl-2-diethylamino-2',4-dimethoxybenzhydrylcarbamate.

EXAMPLE 10

2 - bromo - 5 - chlorobenzophenone + N - methyl-N - isopropylamine+methylisocyanate=N - methyl - 2-(N' - methyl - N' - isopropylamino) - 5 - chlorobenzhydrylcarbamate.

The compounds of the present invention can be used to effectively control acarids, that is mites and ticks. Many economically important species of mites and ticks are known, including the two spotted mite, the red spider mite, the strawberry spider mite, the cattle tick, and the poultry mite. Chemicals useful for the control of mites are often called miticides, while those useful for the control of both mites and ticks are known specifically as acaricides.

For practical use as acaricides, the compounds of this invention are generally incorporated into acaricidal compositions which comprise an inert carrier and an acaricidally toxic amount of such a compound. Such acaricidal compositions, which can also be called formulations, enable the active compound to be applied conveniently to the site of the acarid infestation in any desired quantity. These compositions can be solids such as dusts, granules, or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of acaricides can be dispersed under superatmospheric pressure as aerosols. However, preferred liquid acaricidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the acarid infestation. The emulsifiers most commonly used in these concentrates are nonionic or mixtures of nonionic with anionic surface-active agents.

A typical acaricidal composition according to this invention is illustrated by the following example, in which the quantities are in parts by weight.

EXAMPLE 11

*Preparation of a dust*

| | |
|---|---|
| Product of Example 1 | 10 |
| Powdered talc | 90 |

The above ingredients are mixed in a mechanical grinderblender and are ground until a homogeneous, free-flowing dust of the desired particle size is obtained. This dust is suitable for direct application to the site of the acarid infestation.

The compounds of this invention can be applied as acaricides in any manner recognized by the art. One method for destroying acarids comprises applying to the locus of the acarid infestation, an acaricidal composition comprising an inert carrier and as the essential active ingredient, in a quantity which is toxic to said acarids, a compound of the present invention. The concentration of the new compounds of this invention in the acaricidal compositions will vary greatly with the type of formulation and the purpose for which it is designed, but generally the acaricidal compositions will comprise from about 0.05 to about 95 percent by weight of the active compounds of this invention. In a preferred embodiment of this invention, the acaricidal compositions will comprise from about 5 to about 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with insectides in the compositions heretofore described. These insecticides can comprise from about 5% to about 95% of the active ingredients in the compositions. Use of the combinations of these insecticides with the compounds of the present invention provide acaricidal and insecticidal compositions which are effective in controlling acarids and insects and often provide results unattainable with separate compositions of the individual components. The insecticides with which the compounds of this invention can be used in the compositions to control insects, can include halogenated compounds such as DDT, methoxychlor, TDE, lindane, chlordane, isobenzan, aldrin, dieldrin, heptachlor, endrin, mirex, endosulfon, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemeton-methyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, azobenzene, and the like; organic carbamate compounds such as carbaryl and the like; organic sulfur compounds such as phenothiazine, phenoxathin, lauryl thiocyanate, bis(2-thiocyanoethyl)ether, isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, paradi-chlorobenzene, and the like.

The new compounds of this invention can be used in many ways for the control of acarids, for example, by spraying on plants on which the acarids feed. The quantity of active compound of this invention to be used for acarid control will depend on a variety of factors, such as the specific acarid involved, intensity of the infestation, weather, type of environment, type of formulation, and the like. For example, the application of only one or two ounces of active chemical per acre may be adequate for control of a light infestation of an acarid under conditions unfavorable for its feeding, while a pound or more of active compound per acre may be required for the control of a heavy infestation of acarids under conditions favorable to their development.

The utility of the compounds of the present invention as acaricides was illustrated in experiments for the control of the two spotted spider mite. In these experiments, the test compounds were formulated by dissolving in an organic solvent, such as acetone, and dispensing the solutions in water containing a small amount of emulsifier such as polyoxyalkylene derivatives of monolaurate and/or monooleate. The above formulation was then applied to plants infested with 50 to 100 adults of the mites and held for five days. Thereafter adult mortality was observed. Some of the results were as follows:

| Test Chemical | Concn., Percent Actual Chemical (wt.,/vol. liquid) | Percent Mortality |
| --- | --- | --- |
| Product of Example 1 | 0.35 | 100 |
| Product of Example 3 | 0.35 | 99 |
| Product of Example 4 | 0.35 | 100 |
| Product of Example 1 | 0.10 | 100 |
| Do | 0.04 | 100 |
| Do | 0.01 | 100 |
| Do | 0.004 | 91 |
| Control | | 0 |

The products of the present invention can also be used for the control of fungus growth. When the compounds of this invention are used as agricultural fungicides for desirable crops, they can be applied to plant foliage, to seeds, to the soil, or to such parts of plants as the fruits themselves. Plants are susceptible to a great many diseases which cause widepread damage; and among some of the more important which can be mentioned are late blight on tomato, powdery mildew of cucumber, cereal leaf rust on wheat, and such comon soil fungi as fusarium wilt (*Fusarium oxysporum*), the seed rot fungus *Phythium deboranum*, and the sheath and culm blight *Rhizoctonia solani*. The new compounds of this invention can also be employed as industrial fungicides to control a variety of fungi which attack such materials as adhesives, cork, paints, lacquers, leather, wood, plastics, and textiles such as cotton or wool. The compositions and techniques described above for the use of these compounds as herbicides can also be used when the compounds are used as fungicides.

The utility of the compounds of this invention as fungicides was illustrated by experiments carried out for the control of fungi. In a typical experiment the compounds to be tested were each dissolved in a suitable solvent, such as acetone, containing a small amount of nonionic surface active agents, such as polyoxyalkylene derivatives of sorbitan monolaurate and/or monooleate. Each mixture was then dispersed in water to form test solutions containing 1000 p.p.m. actual compound.

Susceptible species of tomato plants, growing in soil in individual plastic pots were sprayed with the above test solutions when grown to a height of approximately 6–8 inches. Three replicates were used for each treatment. After the spray had dried thoroughly the plants were sprayed with a suspension of spores of tomato late blight fungus, *Phytophthora infestans*, which had been reared on autoclave wheat medium with a small amount of an aqueous dilution of ground lima beans added. After two days to one week, disease symptoms were observed and rated by comparisons to untreated controls.

Experiments were also carried out for control of powdery mildew of cucumber. In these experiments, susceptible species of cucumbers were grown in soil in plastic pots with 2–3 plants per pot. After the cucumber plants are 10 to 14 days old, they are sprayed with the test solutions containing 1000 p.p.m. actual compound, with two to three pots used for each treatment. After the sprays have dried, the pots are placed so that each is surrounded by three plants infested with powdery mildew fungus, *Erysiphe cichoracearum*. After 9 to 14 days, the extent of the disease was observed and rated in comparison with untreated controls.

The results of these experiments are presented below:

| Test Compound | Conc'n Actual Compound, p.p.m. | Control, Percent | |
| --- | --- | --- | --- |
| | | Tomato Late Blight | Powdery Mildew of Cucumbers |
| Product of Example 1 | 1,000 | 85.7 | 92.5 |
| Control | | 0 | 0 |

We claim:
1. A compound of the formula

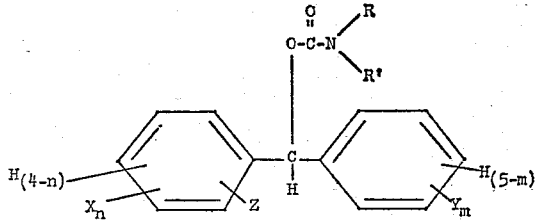

wherein R is selected from the group consisting of lower alkyl, lower alkenyl, lower alkoxyalkyl, lower mono and polychloroalkyl, $R^1$ is selected from the group consisting of hydrogen and R; Z is dialkylamino in the 2-position; each X and Y is independently selected from the group consisting of dialkylamino, alkyl, alkenyl, halogen, nitro, alkoxy and alkylthio; $n$ is an integer from 0 to 2 and $m$ is an integer from 0 to 3.

2. N - methyl-2-dimethylamino - 5 - chlorobenzhydrylcarbamate.

3. N - allyl - 2 - dimethylamino - 5 - chlorobenzhydrylcarbamate.

4. N - isopropyl-2-dimethylamino-5-chlorobenzhydrylcarbamate.

5. N,N-dimethyl-2-dimethylamino-5-chlorobenzhydrylcarbamate.

References Cited

UNITED STATES PATENTS

| | | | |
| --- | --- | --- | --- |
| 2,338,380 | 1/1944 | Hester | 167—30 |
| 2,430,586 | 11/1947 | Ruthruff et al. | 260—618 |
| 2,530,653 | 11/1950 | De Benneville et al. | 260—487 X |
| 2,854,374 | 9/1958 | Huisman | 167—30 |
| 2,868,829 | 1/1959 | Ayres | 260—471 |
| 2,872,476 | 2/1959 | Melkenian | 260—471 |
| 2,956,078 | 10/1960 | Duxbury | 260—471 |
| 3,098,001 | 7/1963 | Werres et al. | 260—482 |

LORRAINE A. WEINBERGER, *Primary Examiner.*

JULIAN S. LEVITT, *Examiner.*

S. J. FRIEDMAN, A. P. HALLUIN, *Assistant Examiners.*

UNITED STATES PATENT OFFICE
CERTIFICATE OF CORRECTION

Patent No. 3,340,294                          September 5, 1967

Sidney B. Richter et al.

It is hereby certified that error appears in the above numbered patent requiring correction and that the said Letters Patent should read as corrected below.

Column 4, line 26, for "element" read -- elemental --; column 8, line 36, for "$R^1$" read -- $R'$ --.

Signed and sealed this 24th day of September 1968.

(SEAL)
Attest:

Edward M. Fletcher, Jr.                          EDWARD J. BRENNER

Attesting Officer                                Commissioner of Patents